Feb. 5, 1924. 1,482,730
R. A. BURFORD, JR
REFRIGERATING SYSTEM
Filed Aug. 26, 1922 6 Sheets-Sheet 1

WITNESS:
Robt R Kitchel

INVENTOR
Robert A. Burford, Jr.
BY
Frank S. Busser
ATTORNEY.

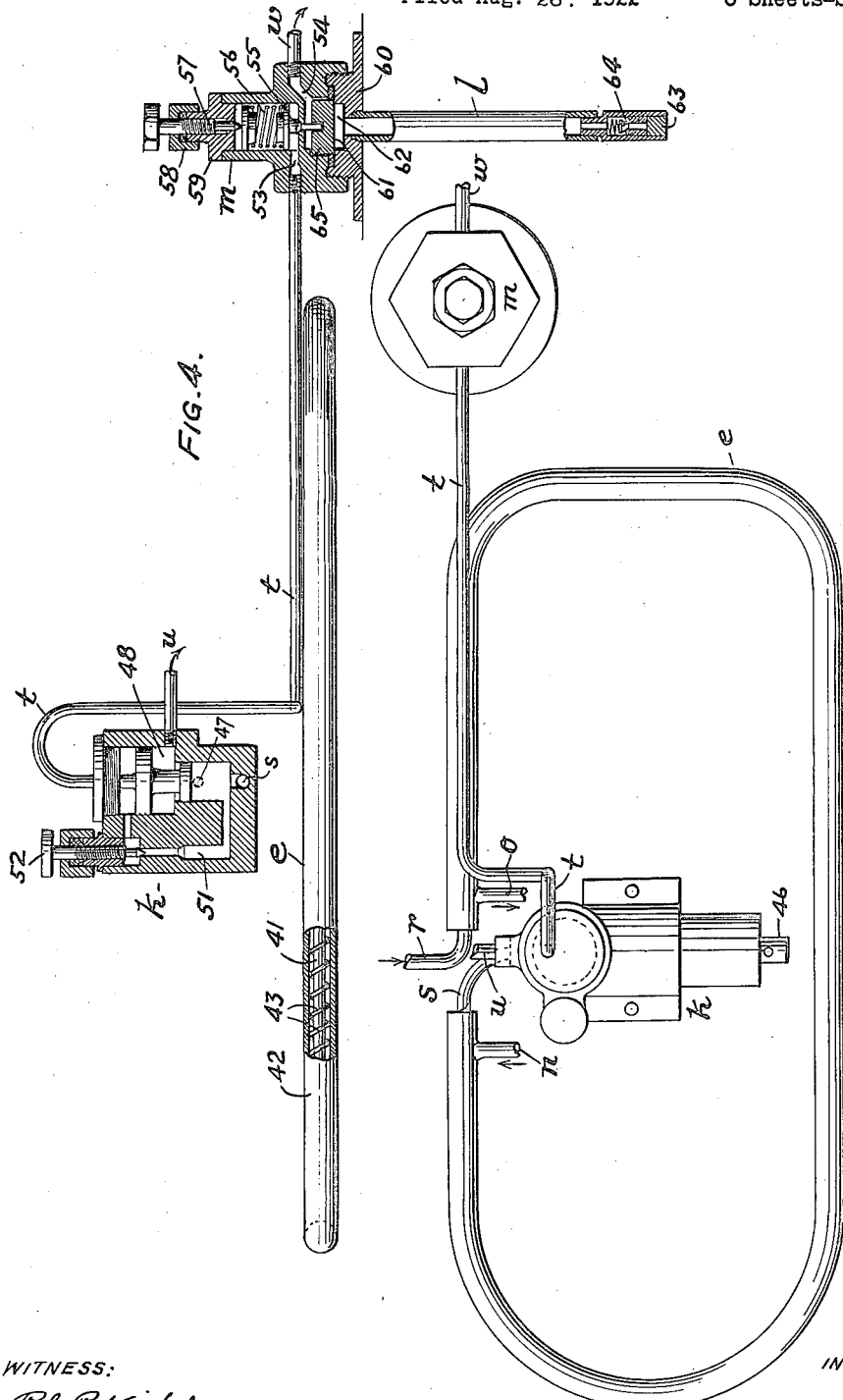

Patented Feb. 5, 1924.

1,482,730

UNITED STATES PATENT OFFICE.

ROBERT A. BURFORD, JR., OF BIRMINGHAM, ALABAMA.

REFRIGERATING SYSTEM.

Application filed August 26, 1922. Serial No. 584,481.

*To all whom it may concern:*

Be it known that I, ROBERT A. BURFORD, Jr., a citizen of the United States, residing at Birmingham, county of Jefferson and State of Alabama, have invented a new and useful Improvement in Refrigerating Systems, of which the following is a full, clear, and exact description, reference being had to the accompanying drawings, which form a part of this specification.

This invention relates to an improvement in refrigerating systems, and more particularly relates to automatic systems of relatively small capacity adaptable for household use.

One of the objects of my invention is to provide a system of this character in which the compressor is automatically controlled by the temperature in the storage chamber and the cooling water for the condenser.

A further object of my invention is to provide a compact machine which is so arranged that all of the parts, with the exception of the expansion coil and the thermostat, are carried on a base which can readily be supported on a refrigerator for family use.

A still further object of my invention is to provide a compressor for the refrigerating medium, which can be operated by a motor requiring a small amount of current, as well as a system in which the flow of water for abstracting heat from the condenser can readily be controlled.

Another object of my invention is to provide a simple and efficient hydraulic motor for actuating the switch for the compressor motor, together with an automatic valve for the hydraulic motor, which is actuated in both directions by the cooling water.

A further object of my invention is to provide a system in which the flow of cooling water is controlled directly by the thermostat, which in turn starts and stops the compressor motor.

The precise nature of my invention will be best understood by reference to the accompanying drawings, which will now be described, it being premised, however, that various changes may be made in the details of construction without departing from the spirit and scope of my invention as defined in the appended claims.

Fig. 3 is a plan view, somewhat diagrammatic, illustrating the circulation of the refrigerating fluid and the cooling water for the condenser.

Fig. 4 is a side view thereof partially in section.

Figures 1, 2:
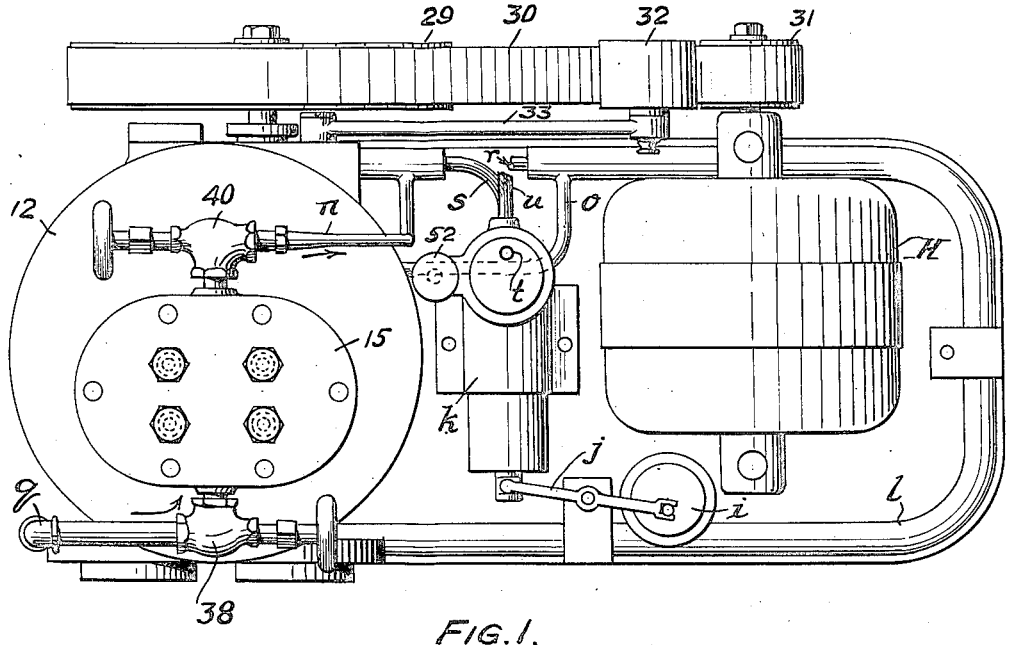
Fig. 1 is a plan view of a complete apparatus, with the exception of the expansion coil and thermostat, embodying one form of my invention.
Fig. 2 is a side elevation thereof.
Figure 6:
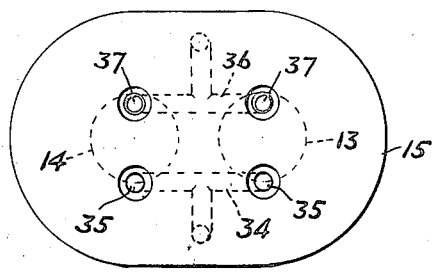
Fig. 6 is a plan view of the head for the compressor cylinders.
Figure 7:
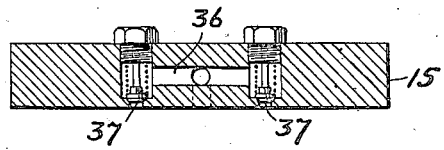
Fig. 7 is a sectional view through the head on a different plane from that shown in Fig. 5.
Figure 5:
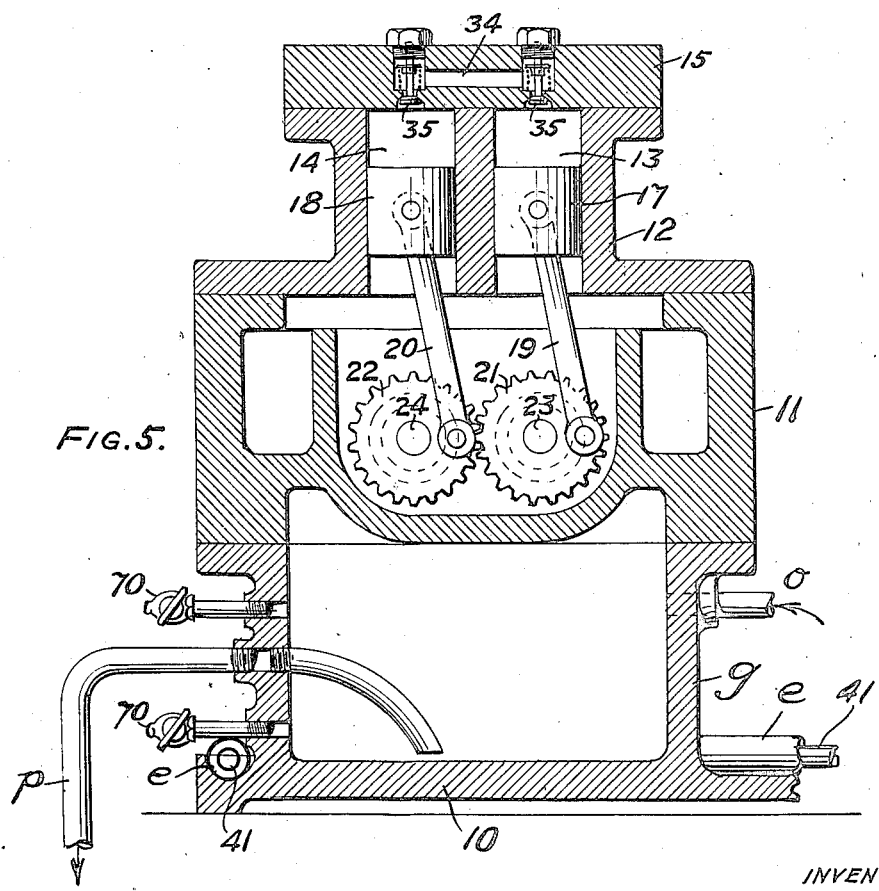
Fig. 5 is a vertical sectional view through the compressor and refrigerating fluid chamber.
Figure 9:
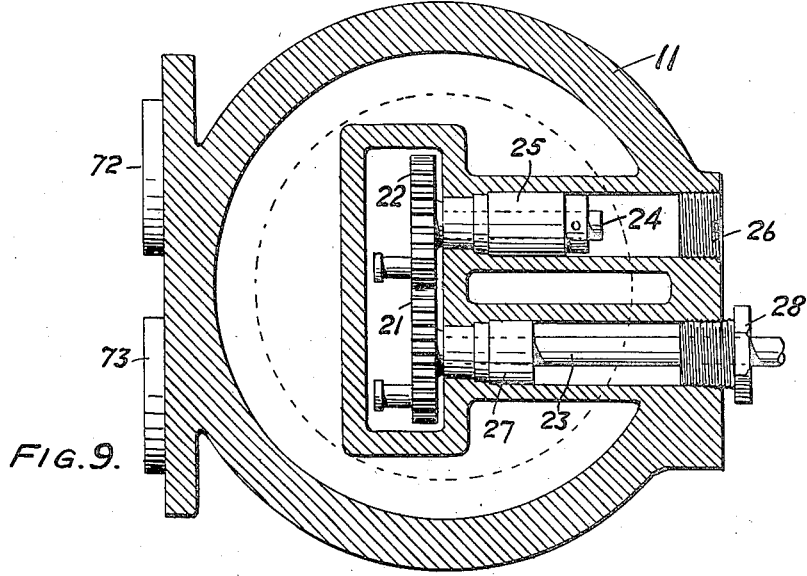
Fig. 9 is a horizontal sectional view through the crank case of the compressor.
Figure 8:
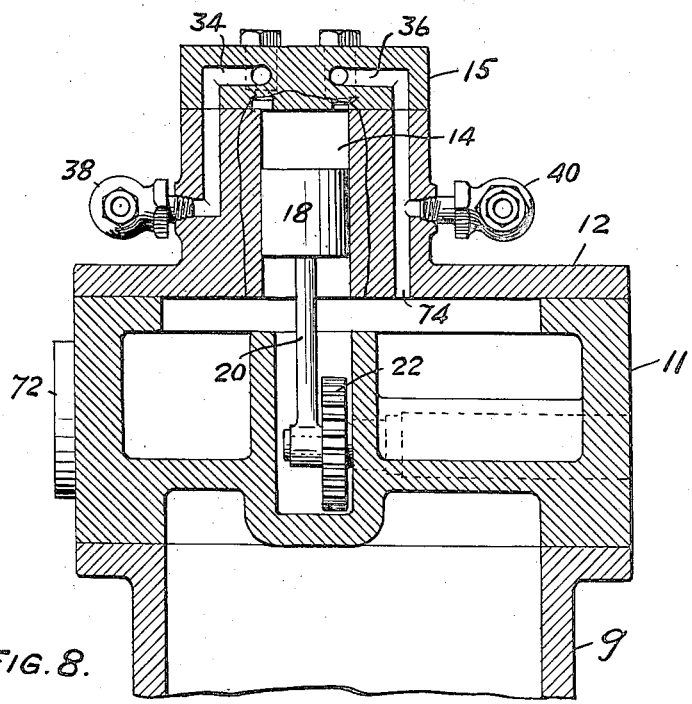
Fig. 8 is another vertical sectional view through the compressor at right angles from that shown in Fig. 5.

I will first describe the general system illustrated in Fig. 12, and later on describe the detail mechanism of the various parts.

The reference character $a$ designates the refrigerating chamber or chamber to be cooled and $b$ a brine tank therein. $c$ is the expansion coil within the brine tank, $d$ the compressor, $e$ the condenser, $f$ the expansion valve, and $g$ a reservoir for the refrigerating fluid below the compressor.

The compressor $d$ is driven by an electric motor $h$, the current for which is controlled by a switch $i$ having a switch lever $j$ which is actuated by a hydraulic motor $k$ connected to the water line for cooling the condenser. $l$ is a thermostat within the refrigerating chamber which controls an outlet valve $m$ in the water line.

The refrigerating fluid line comprises a pipe $n$ extending from the compressor to the condenser $e$, a pipe $o$ from the condenser to reservoir $g$, a pipe $p$ from the reservoir to expansion valve $f$ which is also connected to expansion coil $c$, and a pipe $q$ extending from expansion coil $c$ to the compressor $d$.

The water line comprises an inlet pipe $r$ connected to one end of the condenser and which is provided with a suitable shut-off valve, a pipe $s$ connecting the other end of the condenser with hydraulic motor $k$, a pipe $t$ extending from the motor to thermostat valve $m$ and a pipe $w$ extending from valve $m$ to a suitable waste pipe. $u$ is a pipe extending from the valve mechanism of hydraulic motor $k$ to pipe $w$ for the purpose hereinafter described.

Figure 12:
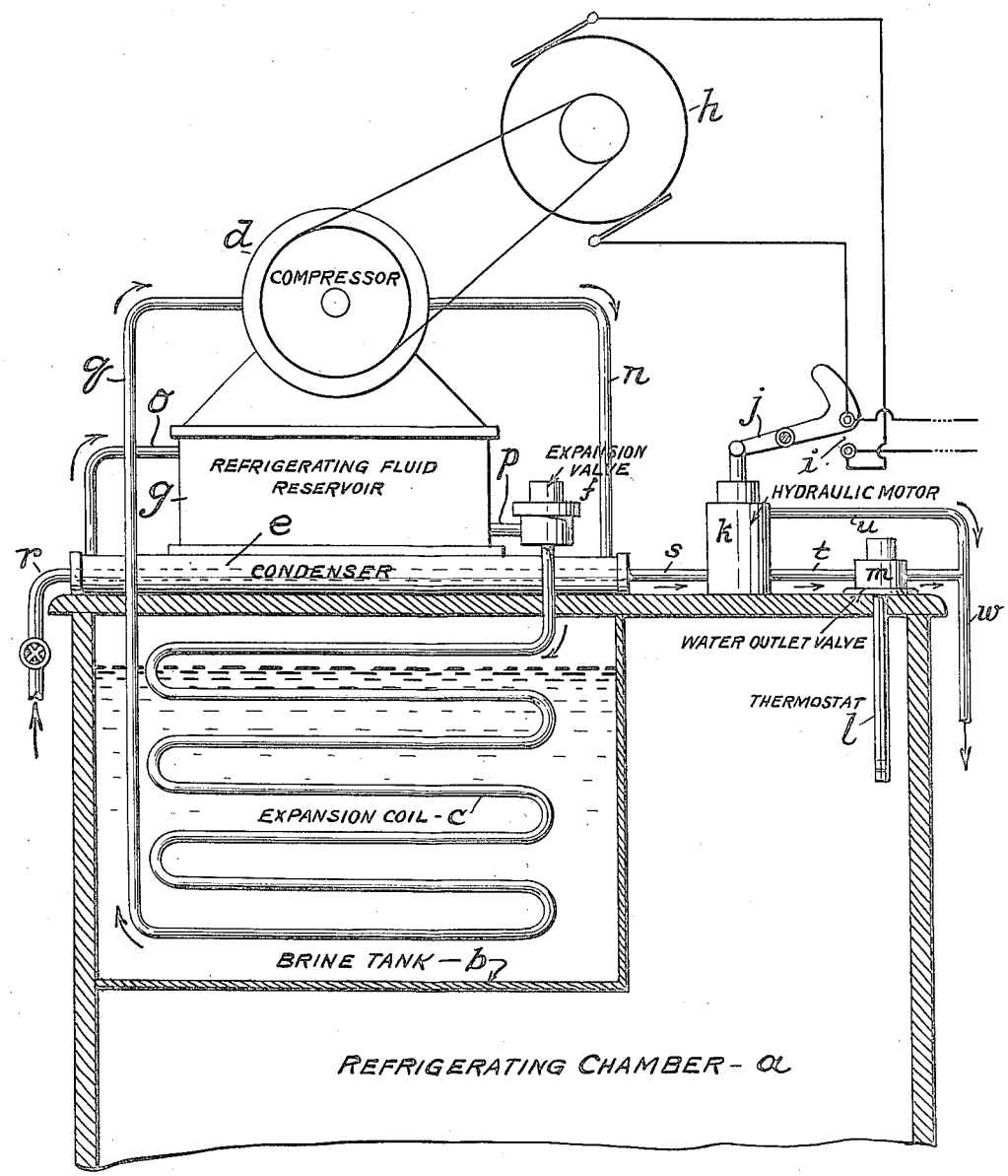
Fig. 12 is a diagram illustrating the entire system.

Assuming the system properly charged with refrigerating fluid, the poles of switch $i$ connected to a source of electrical energy and pipe $r$ connected to a water supply pipe, with the parts set as shown in Fig. 12, there would be no flow of current or water through the system. Under these conditions after the system is in operation, the temperature in the chamber would be between the maximum and minimum limits. As soon as the temperature rises to the maximum limit, the thermostat $l$ will open valve $m$ and permit water to flow through the water line. As soon as water starts to flow through the line, it will actuate motor $k$ in one direction and shift lever $j$ to close switch $i$. The closing of switch $i$ will close the circuit through motor $h$, set the motor to rotating, and thereby operate the compressor. The compressor draws the gas from coil $c$ through pipe $q$, compresses the gas and forces it through pipe $n$, into condenser $e$, in which heat is extracted by the water passing therethrough. The compressed refrigerating fluid passes as a liquid from the condenser to reservoir through pipe $o$, and from which it passes to the expansion coil $c$ through expansion valve $f$. The expansion of the fluid from a liquid to a gas in coil $c$ will extract heat from the brine, which in turn will cool chamber $a$. When the temperature in the chamber has been reduced to the minimum point, the thermostat $l$ will permit valve $m$ to be closed by its spring, as hereinafter described, and shut off the flow of water through the system. This shutting off of the water will cause the hydraulic motor $k$ to shift lever $j$ to open switch $i$, cut off the current to motor $h$ and thus stop the compressor.

The operation above described is repeated when the temperature in the chamber $a$ again rises to the maximum limit.

The reservoir $g$, compressor $d$, motors $h$ and $k$, switch $i$, and condenser $e$ are all connected to and supported on a base casting 10, formed integral with the reservoir $g$, and which is provided with a semi-circular groove in which is supported the condenser $e$.

Mounted on the casting 10 and forming a closure for the reservoir $g$ is a casting 11, which forms the crank case for the compressor. 12 is a second casting secured to casting 11 having two bores 13 and 14, which form the cylinders for the compressor. 15 is a cylinder head secured to the casting 12, which closes one end of each cylinder and also forms the valve casing for the inlet and outlet check valves for the cylinders. 17 and 18 are pistons in the respective cylinders 13 and 14 and which are provided with connecting rods 19 and 20, respectively. The other ends of connecting rods 19 and 20 are connected to gears 21 and 22, respectively, by means of suitable crank pins. These gears 21 and 22 mesh with each other and are connected to shafts 23 and 24, respectively.

Shaft 24 is journaled in a bearing 25 seated in a bore in casting 11, the outer end of the bore being closed by a screw plug 26. 27 is a similar bearing for shaft 23 in casting 11. The shaft 23 is also journaled in a stuffing box in a plug 28, through which the shaft extends. These plugs 26 and 28 seal the ends of said bores and prevent the escape of gas from the crank case.

The outer end of shaft 23 is provided with a driving wheel 29, which is driven by a belt 30 from a small pulley 31 on the shaft of electric motor $h$. 32 is a belt tightening wheel on the end of a lever 33, pivoted to casting 11, and is arranged to retain the belt in proper driving relation on wheel 29 and pulley 31.

The cylinder head 15 is provided with a gas inlet chamber 34, and 35 are inlet check valves controlling admission ports between chamber 34 and cylinders 13 and 14. These valves are retained in their closed positions by suitable springs surrounding their stems and are so positioned relative to the cylinders that their opening movements to admit gas to the cylinders are limited by the upper face of the cylinder casting 12. This is accomplished by so positioning the inlet valve openings that a portion of each is in the plane of its cylinder, while another portion thereof is without said plane and is covered by the face of the cylinder casting 12. This limiting of the opening of the inlet valves will reduce the escape of gas from the cylinders to the inlet chamber 34 when the cranks pass the centers and start on the compression stroke, as the return movement of said valves is relatively short and said valves will be immediately seated at the end of the suction strokes.

The pistons 17 and 18 are so connected to the driving mechanism that the cranks are opposite to each other so that the pistons move in opposite directions to each other.

36 is an outlet chamber in the combined cylinder head and valve casing 15 and which is connected to the cylinders 13 and 14 by outlet ports, which are controlled by spring-pressed check valves 37. The inlet pipe $q$, through which the gas passes to the compressor, opens into chamber 34 and is provided with a shut-off valve 38. The outlet pipe $n$ is connected to the outlet chamber 36 and the inlet end of the condenser $e$ and is provided with a shut-off valve 40.

The condenser $e$ is formed of an inner tube 41, an outer tube 42 and a continuous piece of wire 43 wound helically about tube 41 and which is substantially in contact throughout its length with the outer face of the inner tube 41 and the inner face of the outer tube 42. The ends of the outer tube 42 are closed by caps through which the inner tube 41 extend. The ends of the outer tube 42 are connected to the ends of pipes $n$ and $o$, and the refrigerating fluid in its passage through the condenser $e$ from pipe $n$ to pipe $o$ is caused to move in a helical manner around and along tube 41 through which the cooling water passes from pipe $r$ to pipe $s$. By thus forming the condenser of two tubes with a helical wire between them, I am enabled to form a relatively cheap, simple and short condenser having a relatively long contact surface for extracting the heat from the refrigerating fluid.

Figure 11:
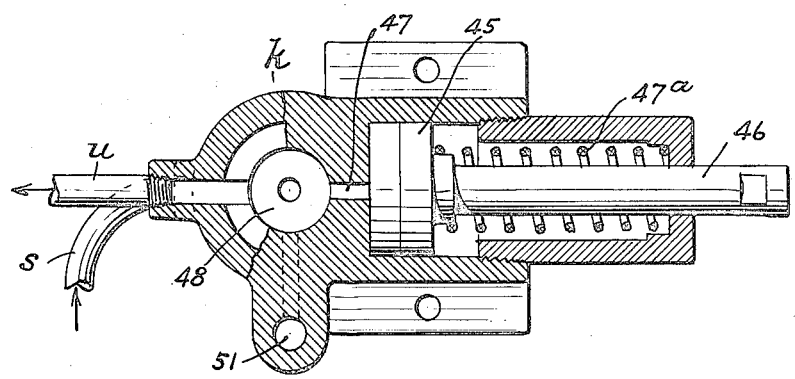
Fig. 11 is a horizontal sectional view thereof on an irregular line.
Figure 10:
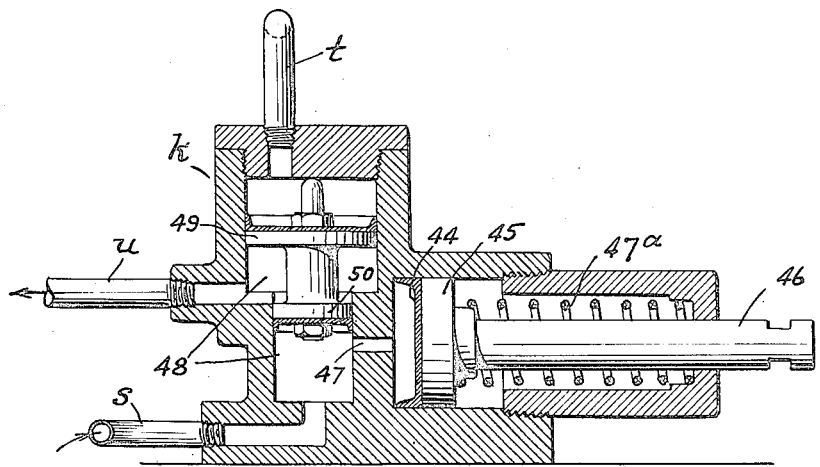
Fig. 10 is a vertical sectional view through the hydraulic motor for actuating the electric switch for the compressor driving motor.

The hydraulic motor $k$, which is shown in detail in Figs. 4, 10 and 11, comprises a cylinder 44 with a piston 45 therein, having a stem 46 extending therefrom and which is connected to lever $j$ of switch $i$.

Surrounding stem 46 of piston 45 is a spring 47ª which is arranged to move the piston inwardly when the pressure on the front of the piston is relieved by opening the cylinder to exhaust, or if the water supply should fail.

Connected to a cylinder 44 by a port 47 is a cylinder 48 of differential areas. Mounted for reciprocation in cylinder 48 is a piston valve having a head 49 in the large portion of the cylinder and a head 50 of reduced area in the smaller portion of the cylinder. The upper and lower ends of cylinder are connected to each other by a passage 51, and 52 is an adjustable needle valve for controlling the rate of flow of water from one end of cylinder 48 to the other end thereof. The pipe $u$ which extends from hydraulic motor $k$ to exhaust or water outlet pipe $w$ from thermostat valve $m$ leads from the cylinder 48 at a point which is always between the heads 49 and 50 of the piston valve.

The pipe $t$ leads from the larger end of cylinder 48, while pipe $s$ from the condenser $e$ leads to the smaller end of said cylinder.

The thermostat valve $m$ comprises a casing having an inlet chamber 53 to which the pipe $t$ is connected and an outlet chamber 54 to which the pipe $w$ is connected. These two chambers 53 and 54 are separated by a septum having a port therethrough which is controlled by a valve 55. 56 is a spring for moving the valve 55 to its closed position and is located in chamber 53, between a head on the valve and an adjustable abutment which is engaged by an adjusting screw 57. The screw 57 extends through a stuffing box 58 in a cap 59 which forms a closure for the upper end of chamber 53. The lower end of chamber 54 is closed by means of a cap 60 and a diaphragm 61, there being a gasket interposed between the cap 60 and valve casing to form a tight joint to seal the lower end of chamber 56, as well as to seal a chamber 62 in the cap 60 below diaphragm 61. The thermostat $l$ comprises a tube closed at its lower end by means of a plug 63 below a suitable charging valve 64, while the upper end thereof is in communication with chamber 62 in cap 60. The tube of the thermostat $l$ is charged with an expansible fluid, which expands and contracts as the temperature of the tube rises and falls.

Supported on the diaphragm 60 and arranged to be moved thereby is a disk 65 having a recess for the reception of a stem extending downwardly from valve 55.

The various parts of the valve $m$ and thermostat $l$ are so arranged that when the thermostat is heated to a predetermined high temperature, the fluid therein will expand sufficiently to raise the diaphragm 60 and raise valve 55 from its seat. This raising of valve 55 from its seat will permit the cooling water to flow through the system for cooling the condenser and closing the electric switch through the medium of the hydraulic motor $k$. When the temperature falls to a predetermined minimum, the fluid in the thermostat will contract sufficiently to permit spring 56 to close valve 55 and shut off the flow of the water through the condenser, and also permit the electrical switch $i$ to be opened and thereby cut off the flow of current to motor $h$.

When valve $m$ controlled by the thermostat $l$ is closed, piston 45, which actuates switch $i$, is in the position shown in Figs. 10 and 11, and the piston valve in cylinder 48 is in its lowered position so that cylinder 44 is open to exhaust through port 47 and pipe $u$. When thermostatic valve $m$ is opened by the thermostat $l$, water is admitted to the lower end of cylinder 48, and as the upper end is open to exhaust or waste through pipe $t$, the valve member in cylinder 48 will be shifted to the position shown in Figs. 4 and 10. This shifting of this valve member will open port 47 to water pressure, which will act on piston 45 against the action of spring 47ª, move the piston 45 together with its stem 46, shift lever $j$ and close switch $i$. This closing of switch $i$ will cause motor $h$ to rotate, which will in turn actuate the compressor $d$.

The valve 49, 50 will be retained in its elevated position as long as the thermostat valve $m$ is open and water will be continuously passed through the system from pipe $r$, through the condenser to pipe $s$, to the lower end of cylinder 48, passage 51 to the upper end of said cylinder, pipe $t$ to thermostat valve $m$ and from thermostat valve $m$ to waste through pipe $w$. The parts will remain in this position until the thermostat valve $m$ is moved to its closed position and when this occurs the flow of water through the system will be cut off. As the outlet through pipe $t$ is closed when the thermostat valve is closed, pressure will build up above piston head 49 on differential valve, and as this piston head is of greater area than piston head 50 said valve will be moved downward and open port 47 to pipe $u$. This opening of port 47 to pipe $u$ will permit the water to escape from cylinder 44 in front of piston 45 and spring 47$^a$ will shift the piston 45 and its stem 46, thereby shifting lever $j$ and open switch $i$, and thereby cut off the current to motor $h$.

The reservoir $g$ for the refrigerating fluid is provided with pet cocks 70 for permitting the escape of air when charging the system, and also for determining the height of fluid in the reservoir.

72 is a pressure gage mounted on one face of crank case casting 11 of the compressor, which is connected with the suction side of the compressor, preferably pipe $q$ as indicated in dotted lines in Fig. 2, and 73 is a similar gage at the side of gage 72 which is connected to the pressure side of the compressor, which is preferably connected to the chamber in the crank case, which is in connection with pressure or outlet chamber 36 by means of an oil return passage 74.

By varying the pressure of spring 56, the temperature at which the chamber is maintained may be varied.

By adjusting the needle valve 52, the flow of water through the system for cooling the refrigerating fluid passing through the condenser may be varied.

The advantages of my invention result from the provision of a simple, efficient, automatic refrigerating system, which is compact, and which can readily be positioned above a household refrigerator, and in which all of the parts, except the refrigerating coil, thermostat and the valve controlled thereby, are supported on a base member to which they are fixedly secured.

A further advantage results from the provision of such a system having a hydraulic motor for actuating the switch for the electric motor, whereby the current to the motor is controlled by the water for cooling the condenser, so that the current is not turned on until water flows through the system, and is turned off when the flow of water stops.

A still further advantage results from the provision of means whereby the cooling water is turned on and off by means of the thermostat in the refrigerating chamber, as well as from the provision of means for readily varying the means for turning on and off the water whereby the normal temperature in the refrigerator may be varied.

A further advantage results from the provision of means for adjusting the volume of flow of the cooling liquid (water) so that the system may be operated at the lowest cost where both water and current are metered.

Another advantage results from the provision of a hydraulic motor having an automatic valve which is controlled by the flow of water through the system, whereby the actuating mechanism for the electrical switch is reduced to a minimum and in which the various elements are directly actuated by the pressure of the water.

A still further advantage results from the provision of a particular type of condenser whereby I am enabled to provide a small condenser with a relatively long cooling surface over which the refrigerating liquid passes.

Still another advantage results from the provision of a compressor having a plurality of pistons and a plurality of crank shafts, geared to each other so that the shafts will rotate in unison with each other, and in which the axes of the shafts are in different planes, so that single armed cranks may be used, and thereby materially cheapen the structure.

Having now fully described my invention, what I claim and desire to protect by Letters Patent is—

1. A refrigerating system having a compressor, an electric motor for driving the compressor, an electric switch for controlling the current for the electric motor, a cooling fluid supply for the system, a valve for controlling the flow of fluid through the system, a temperature actuated device for opening and closing the valve, a fluid pressure actuated motor for opening and closing the switch actuated by the cooling fluid, and an automatic valve for controlling the admission of fluid to and exhaust from the pressure motor arranged to be actuated by the cooling fluid to cause the fluid pressure motor to close the electric switch when cooling fluid is passing through the system and to open the switch when the fluid control valve is closed.

2. A refrigerating system having a compressor, an electric motor for driving the compressor, an electric switch for controlling the current for electric motor, a cooling fluid supply for the system, a valve for controlling the flow of fluid through the system, a temperature actuated device directly connected to the said control valve for opening and closing the valve, a fluid pressure actuated motor for shifting the electric switch, said pressure motor being arranged to be actuated to close the switch when the fluid control valve is opened and to open the switch when the fluid control valve is closed, an automatic valve for controlling the admission of fluid to, and the exhaust from, the fluid pressure motor, and means connected to the automatic valve to cause the cooling fluid to shift the automatic valve in one direction when the control valve is closed and to shift the automatic valve in the other direction when the control valve is opened.

3. A refrigerating system having a continuous refrigerating fluid circuit including a compressor, an electric motor for driving the compressor, an electric circuit including the electric motor, a switch in the electric circuit for controlling the current for the motor, a cooling fluid circuit for cooling the refrigerating circuit, a control valve for controlling the flow of fluid through the cooling circuit, a thermostat for opening and closing the control valve, a fluid pressure motor for actuating the switch in one direction, a spring for actuating the switch in the other direction, an automatic valve in the cooling circuit for controlling the admission of fluid to the pressure motor from the cooling circuit and exhaust from the pressure motor to back of the cooling circuit, and means connected to said automatic valve for shifting said automatic valve in one direction when the control valve is open and for shifting the automatic valve in the other direction when the control valve is closed.

4. A refrigerating system having a refrigerating fluid circuit, an absorbing fluid circuit connected to a constant supply, a motor driven compressor for the refrigerating circuit, a power control device for the motor, a pressure motor connected to the absorbing circuit for actuating the power control device, an automatic valve for the pressure motor and arranged to be moved in one direction when fluid is flowing through the circuit and to be moved in the reverse direction when the flow of fluid is cut off, and a thermostatically controlled valve for the absorbing circuit.

5. A refrigerating system having a refrigerating fluid circuit, an absorbing fluid circuit connected to a constant supply, a motor driven compressor for the refrigerating circuit, a power control device for the motor, a pressure motor connected to the absorbing circuit, said pressure motor having a cylinder, a piston in the cylinder connected to the power control device and arranged to be moved in one direction by the pressure in the absorbing circuit, a spring for moving the piston in the other direction, an automatic valve for controlling the flow to and from the cylinder, said valve being arranged to open the cylinder to pressure when fluid is passing through the absorbing circuit and to open the cylinder to exhaust when the flow through said circuit is shut off, and a thermostatically controlled valve for controlling the outlet from the absorbing circuit.

6. A refrigerating system having a refrigerating circuit through which refrigerating fluid is passed, a cooling circuit through which cooling fluid is passed for cooling a portion of the refrigerating circuit, a compressor in the refrigerating circuit, an electric motor for driving the compressor, an electric switch for the electric motor, an electric circuit including the electric motor and switch, a control valve for controlling the flow of fluid through the cooling system, a thermostat for opening and closing the control valve, hydraulic means, including a differential piston, for shifting the switch included in the cooling circuit, there being a by-pass connecting the opposite sides of said piston to each other, and an adjustable valve for said by-pass, the arrangement being such that when the control valve is open the pressure on the larger area of the piston is reduced to shift the piston in one direction, and when the control valve is closed the pressure on both sides of the piston is equal so that the piston is shifted in the other direction.

In testimony of which invention, I have hereunto set my hand, at Birmingham, on this 21st day of August, 1922.

ROBERT A. BURFORD, Jr.